(12) United States Patent
Brabant et al.

(10) Patent No.: US 6,830,826 B2
(45) Date of Patent: *Dec. 14, 2004

(54) COATED METAL REINFORCEMENT ELEMENT AND COATING MATERIALS

(75) Inventors: Johan Van Brabant, Zwevegem (BE); Daniel Mauer, Bernissart (BE); Richard Michalitsch, Vienna (AT); Francis Garnier, Champigny (FR); Philippe Lang, Vincennes (FR)

(73) Assignee: N.V. Bekaert S.A., Zwevegem (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/834,835

(22) Filed: Apr. 13, 2001

(65) Prior Publication Data

US 2002/0055011 A1 May 9, 2002

Related U.S. Application Data

(63) Continuation of application No. PCT/EP99/02905, filed on Apr. 22, 1999.

(51) Int. Cl.[7] .......................... B32B 15/02; B32B 15/06

(52) U.S. Cl. ...................... 428/625; 428/364; 428/375; 428/379; 428/380; 428/382; 428/383; 428/390; 428/457; 428/462; 428/465; 428/466; 428/615; 428/626; 428/658

(58) Field of Search .............................. 428/364, 375, 428/379, 380, 382, 383, 390, 462, 625, 457, 45, 626, 420, 465, 466, 469, 577, 615, 658

(56) References Cited

U.S. PATENT DOCUMENTS

| 3,793,130 A | 2/1974 | Marzocchi ................... 161/93 |
| 3,857,726 A | 12/1974 | Van Gils ...................... 117/49 |
| 5,518,770 A | 5/1996 | Goliaszewski et al. ..... 427/327 |
| 5,882,799 A | * 3/1999 | Roseboom et al. ......... 428/461 |
| 6,087,519 A | * 7/2000 | Garnier et al. .............. 556/419 |

FOREIGN PATENT DOCUMENTS

| DE | 30 27 277 | 2/1981 |
| EP | 0 182 116 | 5/1986 |
| FR | 2 271 036 | 12/1975 |
| FR | 2 320 974 | 3/1977 |
| WO | WO 97/17144 | 5/1997 |

OTHER PUBLICATIONS

Patent Abstracts of Japan, vol. 008, No. 037, Publication No. 58193114 dated Nov. 10, 1983, "Ultrasonic Welding Method of Laminated Film".

Patent Abstracts of Japan, Publication No. 58193134 dated Nov. 10, 1983, "Adhering Process of Steel Cord and Rubber".

* cited by examiner

Primary Examiner—Monique R. Jackson

(57) ABSTRACT

A coated metal reinforcement element for polymeric or elastomeric materials comprises a coating of: a polymer or prepolymer compatible with and co-polymerizable, co-vulcanizable or crosslinkable with said polymeric or elastomeric material to be reinforced, and bearing functional groups; either covalently bonding to the metal surface of said reinforcement element; or forming covalent bonds with the outward directed first functional groups of a mono-or multimolecular layer of a bifunctional adhesion promotor intercalated between said metal by its second functional groups. A method for the coating includes a one step and a two step procedure.

16 Claims, 1 Drawing Sheet

COATED METAL REINFORCEMENT ELEMENT AND COATING MATERIALS

APPLICATION CROSS-REFERENCE

This application is a continuation of PCT Application No. PCT/EP99/02905 filed 22 Apr. 1999 and which named the United States as a designated country. PCT Application PCT/EP99/02905 was published on 27 Apr. 2000 as Publication No. WO 00/23505 and claims priority of PCT Application PCT/BE98/00153 filed on 15 Oct. 1998.

FIELD OF THE INVENTION

The present invention relates generally to the field of metal-elastomer composites and to the problem of reinforcement of polymers, elastomers and especially rubbers with metal elements such as elongated steel elements. More particularly the present invention relates to a coated metal reinforcement element for polymeric or elastomeric materials, as well as methods for the coating of metal surfaces with organic materials to improve the polymer-to-metal bond.

BACKGROUND OF THE INVENTION

Composites of metal and elastomers wherein reinforcing elements of steel or steel alloys are bonded to rubber are widely applied in a variety of products, including conveyor belts, heavy duty hoses, pulley belts and pneumatic tires.

In today's tire technology, metal reinforcements are generally coated with a brass layer that undergoes a chemical reaction during curing, with the sulfur curable rubber composition leading to a surface layer predominantly consisting of a copper sulfide layer. This copper sulfide layer facilitates adhesion by mechanical and/or chemical interaction with the cured rubber. Rubber compositions of adhesion rubbers in today's technology have to be fine tuned to support the very specific chemical requirements of adhesion layer formation, and the curing system has to be adjusted to the delicate kinetics of copper sulfide formation in order to reach the optimum balance between size and structure of the copper sulfide dendrons. Rubber compositions that are fine tuned for a variety of uses, such as skim compounds in tires, are high cost materials due to the large amount of insoluble sulfur and expensive adhesion promoters like cobalt containing chemicals contained therein. Furthermore, compounding for adhesion rubbers is currently a compromise between the demands of the adhesion system and other demands like the resistance against aging phenomena, corrosion, fatigue and durability under the high shear forces acting in tires in service.

On the other hand there have also been proposed numerous adhesion systems where organic adhesives are interposed between the metal and the elastomer or plastic material to effect an improved metal-to-elastomer/plastic bond. The WO 97/17144 A1 patent, for example, teaches a composition suitable for treating metal surfaces prior to bonding of the metal surfaces to other materials including metals, rubber, glass, polymers, sealants, and coatings, to enhance bond strength and to prolong useful life in corrosive environments. The composition comprising an organoalkoxysilane is capable of crosslinking when applied to the metal surface to form an adherent coating. It is also capable of bonding with the material to be bonded to the metal surface via functional groups, thereby forming a strong adherent bond.

Especially for materials under high stress in service, the use of a thin organic adhesive layer alone may, however, not suffice because there is still the problem of adhesion loss caused by high dynamic loads and shear forces acting across the interface between the rigid surface of the metal with the adhesive and the polymer matrix.

Patent abstracts of Japan vol. 8, no 37, JP 58193134A disclose the coating of a steel cord with liquid rubber bearing COOH or OH functional groups and a vulcanization of said coated cord embedded in a rubber. For this purpose the steel cord is at first transferred into a liquid rubber bath containing preferably a liquid polyisoprene rubber with an average viscosity molecular weight of 15000–50000. Although the liquid rubber is of comparatively low molecular weight, the viscosity of the liquid rubber bath is too high to give thin coating layers. This leads to weak boundary layers with the embedding rubber.

FR 2320974 A discloses a coating for a steel reinforcement element of a first layer of an organosilane and a second layer of an organic RPL adhesive i.e. an aqueous emulsion of a resorcinol-formaldehyde resin and a rubber-containing latex, which is cured thereafter. This product can be used as a reinforcement element for rubber products. The curing of the RFL adhesive makes it impossible to get a smooth boundary layer between the coating and the rubber. Moreover the non-reactive rubber-latex is only held mechanically within the structure of the cross-linked resin and cannot contribute to the bonding between the coating layer and the rubber to be reinforced.

FR 2271036 A discloses a coating for a steel reinforcement element of a first layer of a vinyl polymer comprising OH— and/or COOH-groups and a second layer of a composition of an organic RFL adhesive and a styrene-butadiene vinyl pyridine terpolymer, where both layers are finally heat treated. Therefore, the same drawbacks as described for FR 2320974 A arise.

It is therefore an object of the invention to find an adhesion promoting system between a metal surface and an elastomer that is able to result in superior resistance against aging, corrosion, dynamic loads and shear forces acting across the interface.

SUMMARY OF THE INVENTION

The aforementioned object is achieved by a special adhesion promoting coating of the metal, i.e., a metal reinforcement element for polymeric or elastomeric materials with a coating of a polymer or prepolymer deposited from an aqueous, alcoholic or organic solution and compatible with and co-polymerizable, co-vulcanizable or crosslinkable with said polymeric or elastomeric material to be reinforced, and additionally bearing functional groups, which are either covalently bonding to the metal surface of said reinforcement element or which form covalent bonds with the outward directed first functional groups of a mono- or multimolecular layer of a bifunctional adhesion promotor intercalated between said metal and said coating and bound to said metal by its second functional groups.

There is provided a method for coating a metal surface, more particularly a metal reinforcement element, comprising the steps of depositing an adhesion promoter, from an aqueous, alcoholic, or organic solvent; depositing a functionalized non-cured polymer or prepolymer from an aqueous, alcoholic, or organic solvent, or from the bulk material; which is carried out in a one step procedure or subsequently.

The adhesion promotor is advantageously utilized in a method for coating a metal surface with an adhesion promotor, comprising the preparation of a solution of the adhesion promotor and the dipping or painting of said metal surface with said solution, wherein the adhesion promotor is an organosiloxane of the general formula (I) given below, wherein X is a siloxane group, a chlorosilane group or a bromosilane group, and especially: —SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R'(OR')$_2$); COOH; COCl.

The adhesion promotor is pretreated before use in the following manner: a definite amount of water is added under stirring at elevated temperature, the amount being calculated to at least partially hydrolyse and to partially condense the siloxane. The solution is diluted with alcohol and immediately after a certain ripening period applied to said metal surface, thereby forming a dense mono- or multimolecular layer on the metal surface.

The preparation of the organosiloxane is a step which was found to yield excellent dense coatings of the organosilane adhesion promotor that is intercalated between the metal surface and the polymer matrix of the coating. This results in an excellent performance regarding aging and corrosion of the metal surface.

The pretreatment preferably includes the hydrolyzation of a catalytic amount of the organosiloxane and dilution of this starter solution with diluent, water and the siloxane. Thereby, a partial hydrolyzation of the organosiloxane is achieved.

This solution is diluted with alcohol and immediately after a certain ripening period, applied to the metal surface. Preferably the organosiloxane is 3-amino-propyl-trimethoxysilane.

The metal surface can be treated to clean and/or at least partially oxidize the surface. Preferably the metal surface Is treated with isopropanol (iPrOH), a mixture of isopropanol with water (iPrOH—H$_2$O), or diluted aqueous HCl. It is also possible to treat the surface with KOH or with a carbonate. All these measures can be used alone or in combination with each other.

The method for coating a metal surface, especially of a coated metal reinforcement element, comprises the deposition of an adhesion promotor, especially by use of the pretreated organosiloxane solution, from an aqueous, alcoholic, or organic solvent, or from the bulk material, and the deposition of a functionalized non-cured polymer or prepolymer from an aqueous, alcoholic, or organic solvent in a one step procedure or subsequently.

BRIEF DESCRIPTION OF THE DRAWING

Reference is now made more particularly to the drawing which illustrates the best presently known mode of carrying out the invention and wherein similar reference characters indicate the same parts throughout the views.

DETAILED DESCRIPTION

Figure 1:
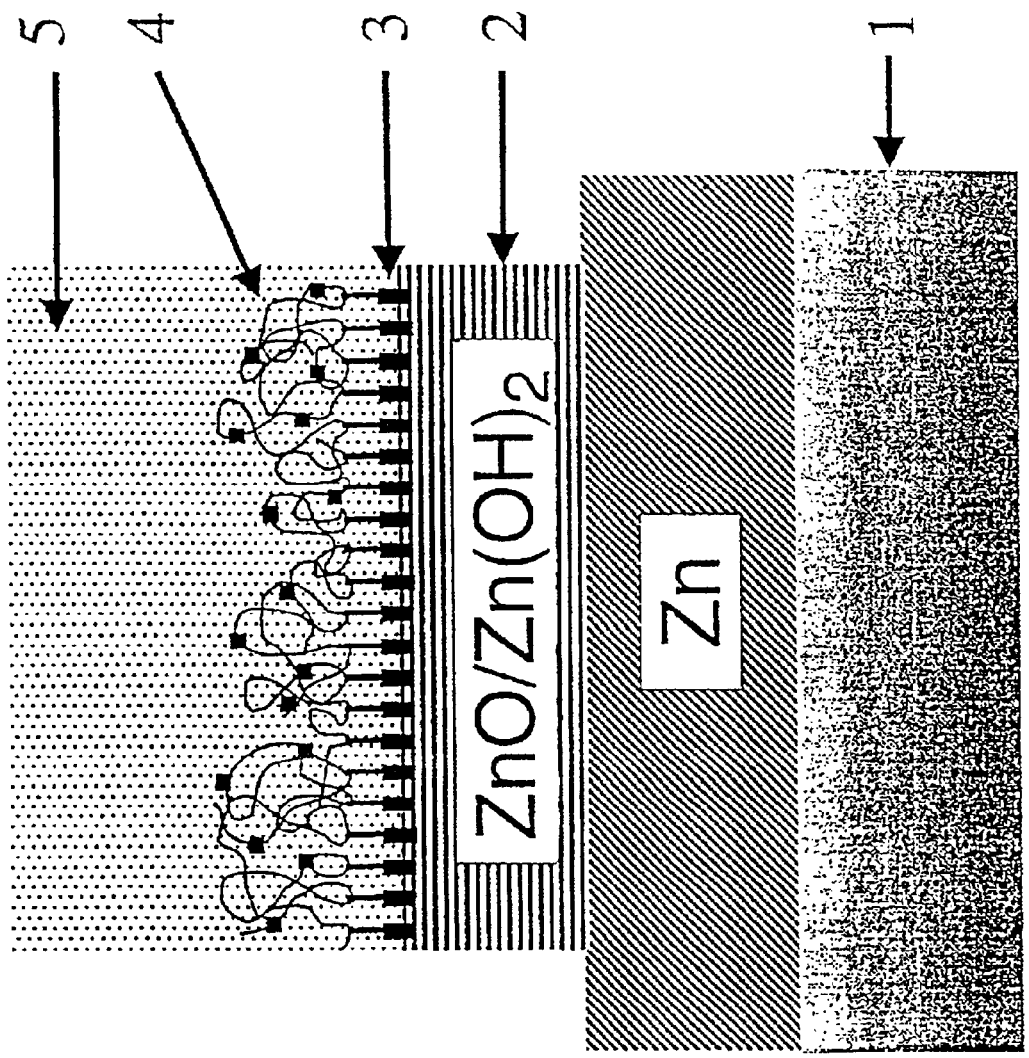
FIG. 1 is a diagrammatic view of the interface between a metal and a material to be reinforced.

An important aspect of the present invention is that the functionalized, non-cured elastomer or polymer composition of the coating forms durable bonds to the bare or coated metal surface and at the same time to the material to be reinforced, despite the different properties of the combined materials. For the latter purpose, the functionalized non-cured elastomer composition, polymer or prepolymer is co-polymerized, co-vulcanized or crosslinked with the polymeric or material to be reinforced. Thus, the module jump between the metal and the vulcanized rubber, elastomer or polymer is smeared in a way especially suited to result in superior resistance against dynamic loads and shear forces acting across the interface.

The intercalated adhesion promoter layer, if present, additionally protects the metal surface against corrosion and makes it possible to use functionalized polymers or prepolymers that could not be directly bound to the metal surface. To meet these requirements, the polymer is functionalized to an extent that supports the formation of a diffuse boundary layer at the interface to the elastomer composition prior and/or during vulcanization. Preferably the functionalization is between 10% and 60%.

The coated metal reinforcement element according to the invention is preferably an elongated steel element.

For the reinforcement of elastomers such as tires, conveyor belts, hoses or timing belts, the steel elements may be single steel filaments or steel wires, also called monofilaments, as strips or ribbons. These monofilaments are coated according to the methods of the invention to provide the coated metal reinforcement elements of the invention. The elements may also be used as a set of steel filaments, according to the invention, which are assembled, bundled, braided, twisted or woven to form a more complex steel structure such as a cord or as a woven steel fabric. An additional layer of the polymeric or nun-cured elastomeric composition to be reinforced may be deposited on top of an assembled structure of this kind. In other cases, and in particular in case of pneumatic tires, the adhesion promoter may be deposited directly onto the assembled steel cord without prior coating of the filaments.

The coated filaments need not have a circular cross-section, but may also take the form of a rectangular, flat or elliptical form.

The diameter of the individual steel filaments is defined as the greatest cross-sectional dimension of a steel filament. This diameter ranges from 0.04 mm for reinforcement of timing belts to 2.0 mm for reinforcement of the bead area of tires.

The steel composition may be advantageously comprised as follows: a carbon content between 0.60% and 1.15%, a manganese content between 0.30% and 0.70%, a silicon content between 0.10% and 0.60%, a maximum sulfur content of 0.05%, a maximum phosphorus content of 0.05%. Micro-alloying with particular elements such as chromium, nickel, vanadium, boron, cobalt, copper, molybdenum etc. is not excluded for amounts ranging from 0.01% to 0.08% and is preferred if high tensile strengths are to be obtained.

The steel wires or steel filaments can be metal coated. Conveniently they are coated with one or more metallic layers such as brass (63.5–67.5% Cu+36.5 –32.5% Zn) or bronze (Cu+Zn+max. 3% Sn). However, in the context of the present invention, preference is given to layer(s) with zinc or zinc alloy. Examples of zinc alloy layers are:

zinc-aluminium alloys such as those comprising 2 to 12% Al+ a mischmetal such as cerium or lanthanum, the remainder being zinc;

zinc-cobalt alloys such as those comprising 0.1% to 50% Co, e.g. 0.1% to 3% Co, the remainder being zinc;

zinc-nickel alloys such as those comprising 20 to 80% Ni, the remainder being zinc;

zinc-iron alloys such as those comprising 0.3 to 1.5% Fe or those comprising 15 to 25% Fe, the remainder being zinc.

Another suitable layer in the context of the present invention may be formed by tin (Sn) or by a tin zinc alloy.

The tensile strength of the steel wires or steel filaments ranges from 1500 MPa (1500 N/mm$^2$) to over 4000 MPa and is mainly dependent upon the final diameter, the exact composition (amount of carbon+amount of micro-alloying components) and on the amount of final drawing reduction. These parameters can be tuned by the skilled practitioner in the field.

The polymer backbone of the coating is preferably the same or similar to the material to be reinforced. It is advantageous to select a functionalized polymer that forms a diffuse interface with the polymeric compound. Preferably, both are non-cured rubber compositions, especially synthetic or natural poly(isoprene) or poly(butadiene). The compositions may comprise common additives such as vulcanization promoters, accelerators, curing systems, etc.

Possible matrix polymers or polymeric backbones may be, for example, thermoplastics, thermoplastic elastomers, and elastomers. Furthermore, the polymer can be, for example, a common thermoplastic polymer such as a thermoplastic polyolefin, olefinic rubber, polyurethane or blends thereof; an elastomeric polymer or copolymer or an at least partially elastomeric block copolymer, such as styrene butadiene rubber, butyl rubber, acrylonitrile butadiene rubber, ethylene propylene diene copolymer, ethylene propylene copolymer, natural rubber, synthetic poly(isoprene) and chloroprene rubber. Moreover common prepolymers can be used that are compatible with and can be co-polymerized or crosslinked with the polymer to be reinforced.

According to the invention, the polymer, prepolymer or the non-cured rubber composition is functionalized in a way to form strong and durable covalent bonds on reaction with the metal surface. The metal surface may be pretreated to be partially oxidized.

The functionalities (X) of the functionalized polymer composition, if bound directly to the metal surface, include thiol groups, mercapto groups, silanes, mono-, di- or tri-alkoxysilanes, the alkyl being methyl, ethyl, propyl, especially:

—SH; —SiHCl$_2$; —SiH$_2$Cl; —Si(Cl)$_3$; —SIHBr$_2$; —SiH$_2$Br; —SiBr$_3$; —Si(R'(Cl)$_2$); —Si(OR')$_3$; —Si(R' (OR')$_2$); —COOH; —COCl; —PO$_3$H$_2$, —SO$_2$H, their acid anhydride and their acid chloride groups;

an organometallic group of the formula —M(OR')$_n$ or —M(Cl)$_n$, whereby M is a metal selected from the group comprising Al, Sn, B, Ti and V, n being the ligand number corresponding to the metal M;

a phthalocyanine or a phthalonitrile group;

a monothiol or a monothiolate group;

and R' being alkyl, namely methyl, ethyl or propyl (branched or unbranched).

Where the functionalized polymer or elastomer, respectively, is not bound directly to the metal surface, but through a bifunctional adhesion promotor intercalated between said metal and said coating in the way that the functional groups of the functionalized polymer react with the outward directed first functional groups (Y) of the bifunctional adhesion promotor to form covalent bonds, the second functional groups (X) of the adhesion promoter react on the metal surface with the metal itself or an oxide or hydroxide thereof.

The functional groups (X) of the adhesion promotor can preferably be as cited above.

The functional groups (Y) of the adhesion promotor can preferably be:

Y: NH$_2$, NHR', or NR'$_2$, or an unsaturated residue, especially an unsaturated terminal double or triple carbon-carbon bond;

an acrylic or methycrylic acid group and its methyl or ethyl esters;

—CN; an activated carboxylic ester; an aldehyde group; an epoxide group;

—SH; —SiHCl$_2$; —SiH$_2$Cl; —Si(Cl)$_3$; —SIHBr$_2$; —SiH$_2$Br; —SiBr$_3$; —Si(R'(Cl)$_2$); —Si(OR')$_3$; —Si(R' (OR')$_2$); —COOH; —COCl; or a functional group capable of forming a complex with at least one ingredient of the polymer matrix or polymer backbone of the coating. This ingredient may be present as such, for example as a pigment, or may have been added to the non-metallic medium specifically so as to allow the formation of a complex with constituent part Y. Y may also be —Si—ONa.

In case the functionalized polymer or elastomer, respectively, is not bound directly to the metal surface, but through the bifunctional intercalated adhesion promotor, the functional groups of the functionalized polymer can preferentially be the following:

thiol groups, mercapto groups, silanes, amines,

—SH; —SiHCl$_2$; —SiH$_2$Cl; —Si(Cl)$_3$; —SIHBr$_2$; —SiH$_2$Br; —SiBr$_3$; —Si(R'(Cl)$_2$); —Si(OR')$_3$; —Si(R' (OR')$_2$); —COOH; —COCl, —PO$_3$H$_2$, —SO$_2$H, their acid anhydride and their acid chloride groups, phtalocyanin or phthalonitril groups, monothiol or monothiolate groups; with R'being alkyl, namely methyl, ethyl or propyl (branched or unbranched), all these groups either as terminal groups or carried along the polymer backbone or as part of side chains.

The functional groups of the functionalized polymer can also be epoxy groups carried along the polymer backbone (like epoxidized natural rubber, an example is given below), as well as epoxy groups being part of side chains attached to the polymer backbone (—CH$_2$—CH$_2$—COC$_{(epoxy)}$—CH$_3$). Amines can be attached in a similar fashion via side groups.

It is important to recognize that there may be a choice as to which partner carries which functional group, the functionalized polymer of the coating or the additional adhesion promoter. The list of possible combinations between X and Y groups includes: amine-epoxy, epoxy-silane, epoxy-acidic moieties, chlorides, and others.

The adhesion promoter optionally used for a better corrosion protection is a bifunctional compound of the general formula (I)

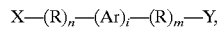

with

X: —SH; —SiHCl$_2$; —SiH$_2$Cl; —Si(Cl)$_3$; —SIHBr$_2$; —SiH$_2$Br; —SiBr$_3$; —Si(R'(Cl)$_2$); —Si(OR')$_3$; —Si(R' (OR')$_2$); —COOH; —COCl, —PO$_3$H$_2$, —SO$_2$H, their acidanhydride and their acid chloride groups;

an organometallic group of the formula —M(OR')$_n$ or —M(Cl)$_n$, whereby M is a metal selected from the group comprising Al, Sn, B, Ti and V, n being the ligand number corresponding to the metal M;

a phthalocyanine or a phthalonitril group;

a monothiol or a monothiolate group;

and R' being alkyl, namely methyl, ethyl or propyl (branched or unbranched);

R: —CH$_2$—; a —(CH$_2$)— chain, whereby $2 \leq n \leq 20$ and whereby said chain may be unhalogenated, partially halogenated or perhalogenated and may contain aromatic or thiophen units, and whereby the chain and/or the units may comprise substituents selected from the group comprising:

—(CH$_2$)$_i$CH$_3$ with 0≦i≦5, —O(CH$_2$)$_j$CH$_3$, or —O(CF$_2$)$_j$CH$_3$ with 0≦j≦4, —CN and —NH$_2$; —CF$_2$; —CH$_2$—CO—NH—CH$_2$; CF$_2$—CO—NH—CF$_2$—; CH$_2$—CO—NH—CF$_2$—; CF$_2$—CO—NH—CH$_2$— and 0≦n,m≦16;

Y: NH$_2$, NHR', or NR', or an unsaturated residue, especially an unsaturated terminal double or triple carbon-carbon bond; an acrylic or methycrylic acid group and ist methyl or ethyl esters;

—CN; an activated carboxylic ester; an aldehyde group; an epoxide group;

—SN; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R' (OR')$_2$); —COOH; —COCl; or a functional group capable of forming a complex with at least one ingredient of the non-metallic medium.

Ar; an aromatic and/or heteroaromatic system, optionally substituted, for example according to the above cited list of substituents.

These types of adhesion promotors are known as such, e.g. from EP 0 802 217 A2.

The coated metal reinforcement element may bear an additional layer of the polymeric or non-cured elastomeric composition to be reinforced on top of said coating. This is a vulcanizable rubber composition, if the product to be reinforced is a rubber product.

The coated metal reinforcement elements may also be assembled to form an assembled structure like a cord or a belt. In that case the assembled structure may comprise an additional layer of the polymeric or non-cured elastomeric composition to be reinforced on top of said assembled structure.

The method for coating a metal surface, especially of a coated metal reinforcement element, with an adhesion promotor that is an organosilane or organosiloxane comprises the preparation of a pretreated solution of the adhesion promotor and dipping or painting said metal surface with said solution. The dipping or painting as such is known in the art and need not be explained here.

The preparation of the organosiloxane is an important step which was found to yield excellent dense coatings of the organosilane adhesion promotor that is intercalated between the metal surface and the polymer matrix of the coating. This minimizes the effects of aging and corrosion of the metal surface.

The pretreatment preferably includes hydrolyzating a catalytic amount of the organosiloxane and diluting this starter solution with diluent, water and the siloxane. Thereby, a partial hydrolyzation of the organosiloxane is achieved. This solution is diluted with alcohol and immediately after a certain ripening period applied to the metal surface. Preferably the organosiloxane is 3-amino-propyl-trimethoxysilane.

The metal surface can be treated to clean and/or at least partially oxidize the surface. Preferably the metal surface is treated with isopropanol (iPrOH), a mixture of isopropanol with water (iPrOH—H$_2$O), or diluted aqueous HCl. It is also possible to treat the surface with KOH or with a carbonate. All these measures can be used alone or in combination with one another.

The method for coating a metal surface, especially of a coated metal reinforcement element, comprises the deposition of an adhesion promotor, especially by use of the pretreated organosiloxane solution, from an aqueous, alcoholic, or organic solvent, or from the bulk material, and the deposition of a functionalized non-cured polymer or prepolymer from an aqueous, alcoholic, or organic solvent, or from the bulk material, in a one step procedure or subsequently.

Surprisingly, it is possible to achieve good results from the deposition in a one step procedure. For this purpose, a mixture of the two materials as cited above or a solution of both—the polymer of the coating and the separate bifunctional adhesion promotor—is applied to the surface.

Alternatively it is also possible to coat the surface subsequently, in a first step with the bifunctional adhesion promotor, and in a second step with the functionalized polymer.

FIG. 1 shows an example of the novel interface between the metal and the material to be reinforced for both possible cases: the functionalized polymer matrix of the coating is a) bonded via an intercalated adhesion promoter to the metal surface or b) directly bonded to the metal surface.

a) Bonding with Intercalated Adhesion Promotor

A zinc-coated steelcord 1 with a partially oxidized surface 2 is covered with a dense layer of a bifunctional adhesion promotor 3. The adhesion promotor molecules (for example a silane) are depicted as small blocks. These adhesion promotor molecules are bonded to a layer 4 of a functionalized polymer via the functionalities depicted as short connection lines. The material to be reinforced ("compound") 5 is bordering on the polymer layer 4 of the coating. The squares illustrate bonds between the polymer of the coating and the compound-polymer, i.e. co-vulcanization points. Between 4 and 5 a diffuse boundary layer is formed, which enhances the resistance against dynamic loads and shear forces acting across the interface.

b) Direct Bonding to the Metal

This case only differs from a) in that layer 3 is formed of the functional groups of the polymer bonding directly to the (oxidized) metal surface 2. There are no adhesion promotor molecules in between.

For a better understanding of the embodiments of this invention examples are given below. It shall be noted that the examples are only illustrative and are not intended to be of a restrictive nature.

The (seperate) bifunctional adhesion promoter of the general formula Y . . . X, being adapted to form a strong adhesion to the (zinc-coated) steel cord surface is referred to as material "A".

The polymer or prepolymer of the coating, compatible with and co-polymerizable, co-vulcanizable or crosslinkable with said polymeric or elastomeric material to be reinforced, is referred to as material "B".

EXAMPLE 1

Preparation of a partially hydrolyzed solution of the bifunctional silane 3-Aminopropyltrimethoxysilane (I) or 3-Aminopropyltriethoxysilane (II) in Isopropanol as SOLUTION A Step 1: Hydrolysis of a Catalytic Amount of 3-aminopropyl-trimethoxysilane (I)

For preparing 1–2 liters of polycondensed silane (polysiloxane) solution, ready for use, 300–600 µl of water are added to 1 ml of compound (I) under stirring, the hydrolysis starts instantaneously. The temperature during the polycondensation might be increased to 65–70° C. in order to obtain a higher degree of condensation.

Step 2: Hydrolysis of the Surface Active Silane

After 2–5 minutes the viscous fluid, obtained from step 1 is diluted with 9–10 ml (or more, depending on the coupling agent ) of methanol and 1–2 ml of water. 9 ml of the surface active coupling silane aminopropyltrimethoxysilane, which are added under intense stirring. The solution becomes ready for use within 5 minutes. The temperature is preferably between 25 and 60° C. Higher temperatures during the hydrolysis yield better results. Better adhesion was found for dilute solution, containing about 0.5 to 1% of the surface active silane. Thus the obtained volume of the primary solution can be filled up to 1 or even 2 liters with methanol before use. The same procedure can be used for compound (II). In general the procedure can be applied on any silane of the general formula Y—R—Si(—OR')$_3$.

Coating of the Metal Element with Material "A" as Prepared Via Example 1

1. per dipping (0.1–5 seconds), the layer's thickness is determined by the concentration of the agent solution (volume of liquid adhering on the metal surface)
2. per painting, less solvent, better evaporation, filling of pores, thickness shows the same concentration function as under 1.

After the deposition the methanol is allowed to evaporate under ambient conditions, in order to conserve a maximum of chemical reactivity. Although drying of the surface is a crucial point, no further curing is applied if possible for the production process. If a dry surface is necessary, the layers may be cured at temperatures between 65 and 100° C. preferably at 65° C. for 10 minutes.

The described general procedures yield dense layers of silanes with a thickness of 200–500 layers in case of dipping (1% solution) and 50–200 layers in case of painting.

The obtained multilayer-system can be applied on slightly hydroxylated metal/metaloxide surfaces for adhesion-promotion to rubber, polyurethane, thermoplastics and so on.

EXAMPLE 2

Solution A

A partially hydrolyzed solution of the bifunctional silane 3-aminopropyltriethoxysilane in isopropanol is prepared according to Example 1.

Solution B

For Solution B a rubber of type ENR-50 was used. ENR-50 is epoxidized natural rubber with a degree of epoxidization of 50%, i.e., on average every second monomer is epoxidized. A 1–2% solution of ENR-50 in toluene is prepared by prolonged stirring under room temperature. Possible gel fractions are removed by filtration.

Steel Cord

A steel cord coated by an electrolytically deposited Zn layer is used in this example.

Dipping

The cord is first dipped in solution A for 1 minute and dried under moderate temperature for 5 minutes. The polymer layer is applied by dipping for 1 minute in solution B. Again the cord is dried under moderate temperature.

Co-vulcanization

A conventional rubber compound was used, consisting of 100 phr NR, 60 phr N326, 5 phr aromatic oil, 2 phr 6PPD, 5 phr ZnO, 1 phr stearic acid, 0.6 phr DCBS, 2.5 phr sulfur. Standard test specimens were prepared and the pull-out force were determined. Values of the pull-out force were comparable to conventional brass technology and good rubber coverage was observed.

The deposition of the polymer cation (material "B") can be accomplished in one step together with an adhesion promoter (material "A").

EXAMPLE 3

1., Before film deposition, the zinc-coated steelcord is cleaned by dipping it 10 seconds in a pure isopropanol solution, iPrOH.

2., Then the dipping solution consisting of materials "A" and "SB" is prepared.

Material "A", various silanes, or mixtures of silanes can be used as an adhesion promoter. In this example aminopropyltrimethoxy-silane (APS) is used.

A first 10 cm$^3$ aqueous solution of isopropanol, iPrOH—H$_2$O was realized, with iPrOH—H$_2$O proportions of 9:1. APS was added to this solution at 1% volume content. Material "B" was added to this solution. In this example, surface-modified polybutadiene was used, which is a powder of some 250 µm size particles. This product is derived by pulverizing commercial tires, and contains varying amounts of polybutadiene-costyrene, polybutadiene, natural rubber, carbon black, petroleum oil, zinc oxides and other additives. 400 mg of this powder is added to the preceding solution of "A". The resulting mixture is a heterogeneous suspension, and is stirred.

The steelcord is then dipped in this "A"+"B" solution for 10 seconds, and then dried 1 minute in an oven at 70° C. The coated steelcord is then ready to use.

Adhesion test results have shown a pull out force of 1023 Newton with an average surface coverage of 3.6, according to a rating based on visual inspection: 1 defining no rubber coverage, 5 defining full thick rubber coverage.

EXAMPLE 4

The same procedure as with example 3 was applied, but using as material "B" an aqueous suspension of polystyrene latex particles, which have been functionalized with pendent carboxylic functions, commercially available under the brand name Estapor® from Rhone Poulenc. These particles have a precise diameter of 1 µm. A quantity of 1% in volume of this aqueous solution is added to a solution of "A", which was made by mixing 0.15% in volume of APS to a iPrOH—H$_2$O 9:1 solution. The steelcord was dipped in this "A"+"B" solution, with a dipping time of 10 seconds, followed by a heating, 1 minute at 70° C. as before.

The adhesion tests showed a pull out force of 1190 Newton and an average coverage of 3.5 according to a rating based on visual inspection: 1 defining no rubber coverage, 5 defining full thick rubber coverage.

In examples 3 and 4 instead of APS a mercaptopropyl-trialkoxysilane or an aminopropyltrialkoxysilane, such as aminopropyltriethoxysilane, can be used.

EXAMPLE 5

In this example a functionalized polymer is given, that bounds directly to the metal surface via functional groups of type (X). The polymer is triethoxysilylpoly-1,2-butadiene. This silane is dissolved under reflux in heptane/toluene 10:1. The wire is dipped in a boiling solution, dried during one hour in air followed by a drying step of 15 minutes at 110° C.

1.) Adhesion to Natural Rubber

The composition of the rubber is: natural rubber: 100 parts, carbon black N300: 60 parts per hundred rubber (phr), oil: 11 phr, zinc oxide: 5 phr, stearic acid: 1 phr, 6-ppd: 1 phr, sulphur: 2.5 phr, MBS: 0.6 phr.

Adhesion is quantified by the pull out force as per ASTM D2229. The embedded length is 25 mm. The vulcanization temperature was 150° C. and vulcanization time was 20 minutes. The pull out speed is 100 mm/min, and the circle of the pull out clamp is 12.7 mm. Prior art stands for untreated zinc coated steel cord.

| | Pull out force (Newton) |
|---|---|
| Prior art sample | 71 |
| Prior art sample | 73 |
| Example 5 | 453 |

2.) Adhesion to a conventional hose rubber compound

| | Pull out force (Newton) |
|---|---|
| Prior art sample | 73 |
| Example 5 | 922 |

We claim:

1. A coated metal reinforcement element for a polymeric or elastomeric material comprising: a metal reinforcement element having a metal surface; and a coating for the reinforcement element comprising a polymer deposited from a solution comprising a solvent selected from the group consisting of an aqueous solvent, alcoholic solvent and organic solvent and compatible with and co-polymerizable with said material to be reinforced, and bearing functional groups covalently bonded with the outward directed first functional groups of a mono- or multi-molecular layer of a bifunctional adhesion promoter intercalated between said metal and said coating and bound to said metal by its second functional groups.

2. A coated metal reinforcement element according to claim 1 wherein said layer of a bifunctional adhesion promoter is a mono-molecular layer.

3. A coated metal reinforcement element according to claim 1, wherein said coated metal reinforcement element is an elongated steel element.

4. A coated metal reinforcement element according to claim 3, wherein said elongated steel element is coated with one or more metallic layers comprising an alloy selected from the group consisting of brass, bronze, zinc, zinc alloy, tin and tin alloy.

5. A coated metal reinforcement element according to claim 4, wherein said zinc alloy is an alloy selected from the group consisting of a zinc-aluminium alloy, a zinc-aluminium-mischmetal alloy, a zinc-manganese alloy, a zinc-cobalt alloy, a zinc-nickel alloy, a zinc-iron alloy and a zinc-tin alloy.

6. A coated metal reinforcement element according to claim 1, wherein the polymer of the coating comprises a polymer matrix selected from the group consisting of thermoplastics, thermoplastic elastomers, thermoplastic polyolefins, olefinic rubbers, polyurethanes, polyurethane blends, elastomeric polymers, elastomeric copolymers and at least partially elastomeric block copolymers.

7. A coated metal reinforcement element according to claim 6, wherein the elastomeric block copolymer is selected from the group consisting of styrene butadiene rubber, butyl rubber, acrylonitrile butadiene rubber, ethylene propylene dien copolymer, ethylene propylene copolymer, natural rubber, synthetic poly(isoprene), chloroprene rubber, and a functionalized non-cured rubber composition.

8. A coated metal reinforcement element according to claim 7, wherein the non-cured rubber composition is selected from the group consisting of a synthetic poly(isoprene), a natural poly(isoprene), a synthetic poly(butadiene), and a natural poly(butadiene) and includes common vulcanization additives and curing materials.

9. A coated metal reinforcement element according to claim 1, wherein the functional group is selected from thiol groups; mercapto groups; silanes; amines; —SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R'(OR')$_2$); —COOH; —COCl; —PO$_3$H$_2$; —SO$_2$H; their acid anhydride and their acid chloride groups; organometallic groups of the formula —M(OR')$_n$ or —M(Cl)$_n$, whereby M is a metal selected from the group consisting of Al, Sn, B, Ti and V, n being the ligand number corresponding to the metal M; phthalocyanine or phthalonitrile groups; or monothiol or monothiolate groups, wherein R' is alkyl, methyl, ethyl or propyl; these functional groups either as terminal groups or carried along the polymer backbone or as part of side chains, further including epoxy groups carried along the polymer backbone as well as being part of side chains attached to the polymer backbone (—CH$_2$—CH$_2$—COC (epoxy)—CH$_3$).

10. A coated metal reinforcement element according to claim 1, further including an adhesion promoter that is a bifunctional compound of the general formula (I)

X—(R)$_n$—(Ar)$_l$—(R)$_m$Y       (I)

with X representing a group capable of reacting covalently at the metal surface, R representing an organic spacer chain, Ar representing an aromatic and/or heteroaromatic system, Y representing a group capable of forming covalent bonds to a group selected from polymer of the coating, and $0 \leq n, m \leq 16; 0 \leq l \leq 6$.

11. A coated metal reinforcement element according to claim 10, wherein the general formula (I) is as follows:

X: —SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R'(OR')$_2$); —COOH; —COCl; —PO$_3$H$_2$; —SO$_2$H; their acid anhydride and their acid chloride groups;

an organometallic group of the formula —M(OR')$_n$, whereby M is a metal selected from the group consisting of Al, Sn, B, Ti and V, n being the ligand number corresponding to the metal M;

a phthalocyanine or a phythalonitrile group; or a monothiol group or a monothiolate group;

with R' being alkyl,

Y: NH$_2$; NHR'; NR'$_2$; or an unsaturated residue, having an unsaturated terminal double or triple carbon-carbon bond; an acrylic or methacrylic acid group and its methyl or ethyl esters;

—CN; an activated carboxylic ester; an aldehyde group; an epoxide group;

—SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R'(OR')$_2$); —COOH; —COCl; or a functional group capable of forming a complex with at least one ingredient of a non-metallic medium;

R: —CH$_2$ or a —(CH$_2$)$_n$— chain and whereby $2 \leq n \leq 20$ and whereby said chain may be unhalogenated, partially halogenated or perhalogenated and may contain aromatic or thiophen units, and whereby the chain and/or the units may comprise substituents selected from the group consisting of:

—(CH$_2$)$_i$CH$_3$ with 0≦i≦5, —O(CH$_2$)$_j$CH$_3$; —O(CF$_2$)$_j$CH$_3$ with 0≦j≦4; —CN; —NH$_2$; —CF$_2$—; —CH$_2$—CO—NH—CH$_2$—; —CF$_2$—CO—NH—CF$_2$—; —CH$_2$—CO—NH—CF$_2$—; and CF$_2$—CO—NH—CH$_2$—;

Ar: an aromatic and/or heteroaromatic system substituted for the substituents.

12. A coated metal reinforcement element according to claim 1, including a layer of a polymeric or non-cured elastomeric composition on top of said coating for further reinforcement, wherein said layer comprises polymers that could not be directly bound to the metal surface.

13. A coated metal reinforcement element according to claim 12, wherein the non-cured elastomeric composition of the additional layer is a vulcanizable rubber composition.

14. A coated metal reinforcement element according to claim 1, wherein said polymer is co-vulcanizable with said polymeric or elastomeric material to be reinforced.

15. A coated metal reinforcement element according to claim 1, wherein said polymer is crosslinkable with said polymeric or elastomeric material to be reinforced.

16. A coated metal reinforcement element according to claim 11, wherein said R', being an alkyl, is a methyl, ethyl or propyl.

* * * * *